United States Patent
Guo

(10) Patent No.: US 8,219,726 B2
(45) Date of Patent: Jul. 10, 2012

(54) METHOD FOR DATA TRANSFER BETWEEN HOST AND DEVICE

(75) Inventor: Tang He Guo, Singapore (SG)

(73) Assignee: Thomson Licensing (FR)

( * ) Notice: Subject to any disclaimer, the term of this patent is extended or adjusted under 35 U.S.C. 154(b) by 193 days.

(21) Appl. No.: 12/215,139

(22) Filed: Jun. 25, 2008

(65) Prior Publication Data

US 2009/0043923 A1 Feb. 12, 2009

(30) Foreign Application Priority Data

Jun. 29, 2007 (EP) .................................... 07301188

(51) Int. Cl.
*G06F 13/38* (2006.01)
(52) U.S. Cl. .............................. 710/56; 710/31; 710/33
(58) Field of Classification Search ........................ None
See application file for complete search history.

(56) References Cited

U.S. PATENT DOCUMENTS

| | | | |
|---|---|---|---|
| 6,816,929 B2* | 11/2004 | Ueda ................................. | 710/56 |
| 2001/0056513 A1 | 12/2001 | Ueda | |
| 2002/0199053 A1* | 12/2002 | Kondoh .......................... | 710/310 |
| 2004/0093454 A1* | 5/2004 | Teng .............................. | 710/310 |
| 2004/0133708 A1 | 7/2004 | Augustin et al. | |
| 2005/0010702 A1* | 1/2005 | Saito et al. ....................... | 710/52 |

FOREIGN PATENT DOCUMENTS

EP 1698976 9/2006

OTHER PUBLICATIONS

Search Report dated Dec. 10, 2007.

* cited by examiner

*Primary Examiner* — Ilwoo Park
(74) *Attorney, Agent, or Firm* — Jack Schwartz and Associates, PLLC

(57) ABSTRACT

The present invention relates to a method for data transfer between a host and a device as well as to respective apparatus. A host is seen as a communication apparatus which organizes data traffic. A device is seen as dependent on the host. In a tiered-star topology there are usually multiple devices connected to one host.

A method for data transfer between a host and a device through pipes is presented. The available memory in the host is divided into multiple segments. The assignment of segments is changed between pipes in dependence on the pipe traffic.

16 Claims, 3 Drawing Sheets

METHOD FOR DATA TRANSFER BETWEEN HOST AND DEVICE

This application claims the benefit, under 35 U.S.C. §119 of EP Patent Application 07301188.4, filed Jun. 29, 2007.

FIELD OF THE INVENTION

The present invention relates to a method for data transfer between a host and a device as well as to respective apparatus. A host is seen as a communication apparatus which organizes data traffic. A device is seen as dependent on the host. In a tiered-star topology there are usually multiple devices connected to one host.

BACKGROUND OF THE INVENTION

In general, during data communication using for example Universal Serial Bus protocol often referred to as USB protocol, the available memory in a host may be divided in multiple segments. Each memory segment is allocated to certain functionality, for example being a buffer for bi-directional control traffic, being a buffer for incoming data traffic or being a buffer for outgoing data traffic. Memory demands are strongly dependent on the used USB device. The requirements of a USB device can be defined full-custom by the device vendor or a device can belong to a certain USB class. USB classes can be for example Human Interface Device class, also called HID class, Mass Storage Device class, Video Device class, Hubs, Wireless controllers and more. A USB class defines certain behavior of a device belonging to this class.

A device belonging to the mass storage class for example features large bursty data. Therefore, it uses bulk transfer as USB endpoint type. Bulk transfer does not guarantee any latency or minimum bandwidth and will use the un-allocated bus bandwidth. Usually mass storage devices are characterized by having data streams mainly from the device to the host, the so called 'reading', or from the host to the device, the so called 'writing'. There is no bidirectional data transmission in terms of equal data rates from the device to the host and vice versa.

USB communication is performed through pipes, each pipe is connected to an endpoint at the host side as well as at the device side. Data transmission on each endpoint can be independent from each other. Data transmission between two endpoints is always unidirectional. For bidirectional data transmission at least two endpoints in the host and two corresponding endpoints in the device are necessary. Sole exceptions are control pipes which work bidirectional. Between each host and each device only one control pipe is established.

Each endpoint allocates a certain amount of memory to ensure functionality. The size of this memory determines the speed of the connection up to a certain extent.

Patent Abstract of JP2006252334 discloses a data transfer control method and a data transfer controller for allocating a fixed size of buffer area on a shared memory to a pipe. Furthermore, memory of a fixed size is allocated to each port.

If memory of a fixed size is allocated to each pipe and data transfer is mainly in one direction as described above, a substantial amount of allocated memory is used inefficiently. Furthermore, if memory of a fixed size is allocated to each port and thus to each device connected, then a lot of memory will be wasted if a device requires small memory.

SUMMARY OF THE INVENTION

According to the invention, the available buffer memory in a host device is divided into multiple segments. If a device is connected to a port, after doing some control transfer performed over a control pipe, the device and the host will open other device specific pipes, each one terminated with an endpoint in the device. Establishing a bidirectional communication link, an IN pipe and an OUT pipe in the host is necessary as well as the corresponding endpoints in the device. According to the invention, a memory segment is allocated to an IN-OUT pipe pair. This memory is assigned to either the IN pipe or the OUT pipe depending on the direction of communication. Following the fundamental idea of the invention leads to unidirectional transmission because memory used for a certain device is allocated only to IN pipes or OUT pipes at a certain time. Bidirectional transmission is achieved during switching the memory between IN pipes and OUT pipes over time. Hence, direction of data transmission can be changed sequentially. Thus, memory is only allocated to endpoints which are currently in use and no memory is allocated but no used. The proposed solution has the advantage that waste of memory is almost omitted and uses the overall available memory efficiently. An IN-OUT pipe pair is not limited to have only one memory area assigned to. Assigning multiple memory segments to a single IN-OUT pipe pair is also within the scope of the invention and provides faster transmission. In case of multiple pipes of the same type belonging to one port, meaning multiple IN pipes or multiple OUT pipes, multiple memory segments can be switched between different types of pipes or can be switched between the same types of pipes as described below.

In an advantageous manner, one or multiple flags are used to indicate that the memory segment is allocated to an IN pipe or OUT pipe. This memory segment can be switched with low complexity and the flag can also be used to identify the currently active pipes. This allows fast reallocation of a certain memory segment and keeps the system flexible.

In an advantageous manner, two flags indicate the affiliation of a memory segment. The device, which is connected via this memory segment, is identified by a first flag. The second flag indicates how many pipes and hence how many endpoints in the device have access to this memory segment.

Advantageously the invention is used for bulk transfer mode. This endpoint type is characterized by bursty data which is sent in many cases mainly in one direction. Usually, either IN pipes or OUT pipes are mainly unused. Further packet size can be relatively big which demands large buffer sizes. Effective use of the available memory by a smart memory allocation system as described above leads to significant performance improvements.

According to the invention switching between different types of pipes is performed such that memory is allocated to IN pipes of a port in case of data sent to the host via this port and memory is allocated to the OUT pipes of a port in case the host is sending data to the corresponding device. With this type of allocation memory is used most efficiently.

According to the invention, in case of multiple IN pipes and multiple OUT pipes in the host which correspond to one device, the number of memory segments assigned for these pipes may exceed the number of pipes of a certain type. In other words, more memory segments are assigned than IN pipes or OUT pipes are available. This means that different numbers of memory segments can be assigned to different pipes of one type. For example a certain pipe type may be an IN pipe. An OUT pipe is considered as another pipe type. The number of memory segments assigned to a certain pipe may change during time according to the data traffic.

For example, in case of two IN pipes and two OUT pipes and the host is receiving data, that means the two IN pipes are activated. If three memory segments are assigned to the said two pipes, three memory segments have to be distributed to two pipes. Two memory segments may be assigned to the fist IN pipe and one memory segment may be assigned to the second IN pipe. If memory demands on the two pipes are changing, the three memory segments may be reassigned and afterwards one memory segment will be assigned to the first IN pipe and two memory segments may be assigned to the second IN pipe. The same is true for OUT pipes. This can be the case whenever multiple pipes of the same direction are opened in one port and the number of memory segments assigned to this port, without regarding the ones reserved for control traffic, exceeds the number of pipes in one direction. For example, during the transmission of a movie in which the audio data and the video data will be transmitted through different pipes, in the common case the video data will exceed the audio data. Hence, there will be more memory segments assigned to the video pipe than to the audio pipe. If within a movie there is a sequence with very simple video data, for example a black screen and at the same time very large audio data, for example music with low compression, the ratio of audio data and video data may change temporarily. Some memory segments assigned to the video pipe will be reassigned to the audio pipe temporarily.

According to one advantageous embodiment the invention, the whole memory available for data transfer is shared. In other words the whole available buffer memory is divided into segments and all segments can be assigned based on the need of the endpoint. This guarantees the use of all available memory more efficiently which can not be done using a method known in the art. Sharing all memory is made possible according to the invention. Even if the whole available memory is allocated, a new device can still be connected to another port because the memory allocation system is flexible and memory can be allocated to a newly included device without crashing the system. This is true under the assumption that multiple memory segments are assigned at least to one of the existing pipes, hence, there is no lack of memory.

In an advantageous embodiment memory segments assigned to control pipes are not switched. Memory demands for the control pipes are normally limited, because data rates on the control pipes are low. Transmission on control pipes is bidirectional and control traffic can be used to achieve important features such as clearing stall condition happened to other endpoints.

Therefore, assigning fixed memory to control endpoint does not waste much memory and further does not differ from the basic concept of the invention to use common memory for incoming and outgoing traffic. Further, assigning fixed memory to the control pipes reduces breakdown risk of the system.

Preferably the invention is implemented for data transfer according to USB protocol. However, the invention can also be advantageously used with other protocols supporting sequential data transfer through pipes or other virtual paths.

The invention is now described in more detail using exemplary embodiments shown in the figures.

The scope of the presented invention is not limited to the described examples.

DETAILED DESCRIPTION OF PREFERED EMBODIEMENTS

Figure 1:
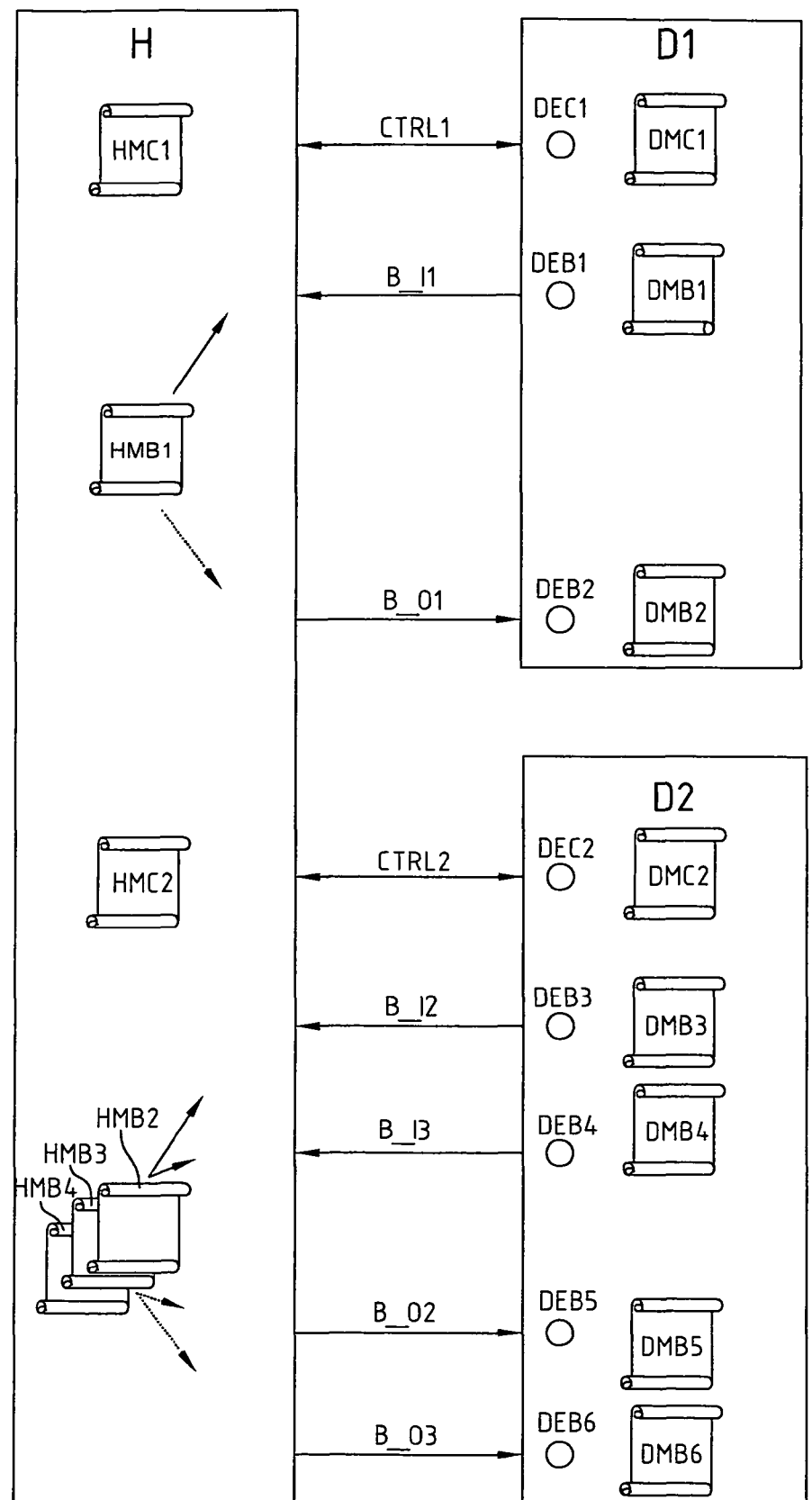
FIG. 1 shows the sharing of allocated memory for data pipes in a host, to which multiple devices are connected.

FIG. 1 shows two device apparatus D1 and D2 connected to a host apparatus H in an exemplary embodiment. The description applies to similar embodiments, having multiple or only one device connected to. In the described embodiment, only the host H uses a memory sharing algorithm. The devices D1, D2 allocate separate memory to each endpoint. Nevertheless, memory sharing can be implemented similarly in the devices. Also more than one memory segment can be assigned to one endpoint in the devices.

Data communication between the host H and the fist device D1 is done via one in pipe B_I1 and one out pipe B_O1. Further a bidirectional control pipe CTRL1 exists. In an exemplary embodiment, memory HMC1 is assigned separately to the control pipe CTRL1. Nevertheless, it is also within the scope of the invention to apply shared memory segments to the control pipes.

Shared memory HMB1 is assigned to the in pipe B_I1 and the out pipe B_O1. This shared memory may consist of one memory segment or multiple memory segments. The memory is assigned in case of incoming data to the in pipe B_I1. In case of outgoing traffic memory is assigned to the out pipe B_O1. This is indicated by the arrows. One or multiple flags or another distinction means marks each memory segment to which pipe it currently belongs. Assigning and reassigning the memory segments to the corresponding pipes can be done for example like described below.

Data communication between the host H and the second device D2 is done via two in pipes B_I2, B_I3 and two out pipes B_O2, B_O3. Further a bidirectional control pipe CTRL2 exists. In an exemplary embodiment, memory HMC2 is assigned separately to the control pipe CTRL2. Nevertheless, it is also within the scope of the invention to apply shared memory segments to the control pipes.

Shared memory HMB2, HMB3, HMB4 is assigned to the in pipes B_I2, B_I3 and the out pipes B_O2, B_O3. This shared memory may consist of multiple memory segments. The number of memory segments corresponds to the number of in or out pipes or the number of memory segments is higher than the number of in or out pipes. The memory segments are assigned in case of incoming data to the in pipes B_I2, B_I3. In case of outgoing traffic memory is assigned to the out pipe B_O2, B_O3. This is indicated by the arrows. A flag or another distinction means marks each memory segment to which endpoint it belongs. Assigning and reassigning the memory segments to the corresponding pipes can be done for example like described below.

Figure 2:
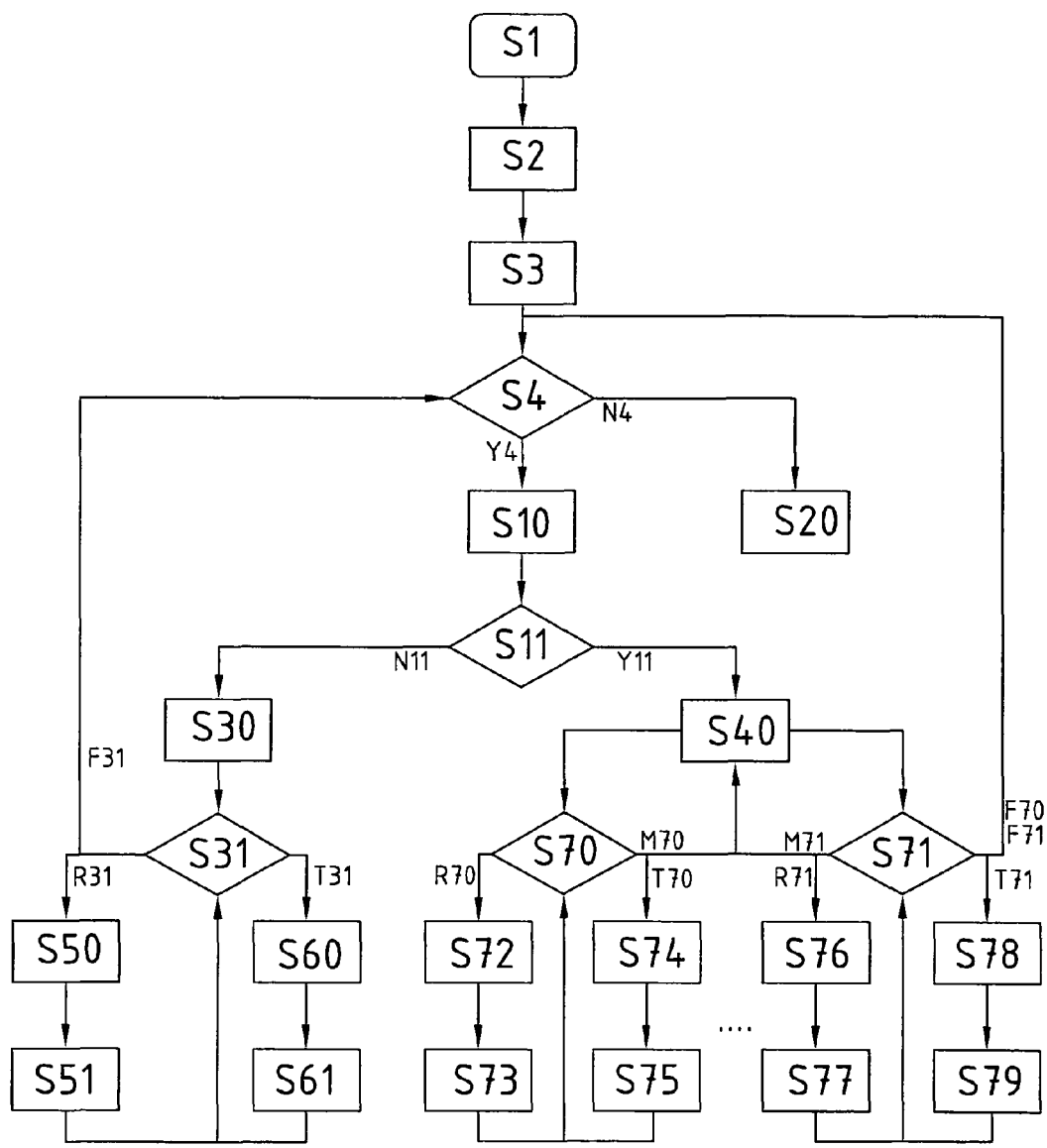
FIG. 2 shows the method to allocated memory and initiate memory sharing

FIG. 2 illustrates schematically a method of memory sharing in a host according to the invention in detail.
S1 Device connected
S2 Assign memory to control pipe
S3 Setup communication
S4 Bulk/ISO transfer?
S10 Sequential mode
S11 Multiple in or out pipes?
S20 Assign memory segment to each pipe separately
S30/S40 Allocate memory segments to pipe pairs
S31/S70/S71 Receive or transmit?
S50/S72/S76 Assign memory to in pipes
S51/S73/S77 Receive data
S60/S74/S78 Assign memory to out pipes
S61/S75/S79 Send data If a device is connected to any USB port of the host S1, a control pipe is established for the corresponding port and memory is assigned to this control pipe S2. Further setup is done S3 and mode of communication is identified according to the device request S4. In case of time dependent devices N4, interrupt transfer is established for example. Memory is assigned to in pipes and out pipes separately S20 and an USB connection known in the art is established. In case of transfer using high data rates Y4, bulk transfer is established for example, which does not have such strict latency requirements. Also some kinds of isochronous transfer fall within the scope of this category. If it is decided to work sequentially and to share memory according to the presented invention Y4, sequential mode is established S10. A decision S11 is made if a single in and a single out pipe is established N11 or if multiple in pipes and/or multiple out pipes are established Y11 according to the device requirement and according to the host resources. In case of a single in pipe and a single out pipe N11, memory is allocated to this pipe pair S30. This can be a sole memory segment or multiple memory segments to enhance the buffer capacity. Decision is made if receive mode R31 or send mode T31 is established S31 according to the protocol. In the first case R31, memory is assigned to the in pipe S50 and data are received S51. In the later case T31, memory is assigned to the out pipe S60 and data are sent S61. Switching from receive R31 to send mode T31 and vice versa is possible using decision S31. If a transmission mode is finished F31 a new transmission mode can be chosen for the same device S4 or the device can be disabled alternatively which is not shown in the diagram. In case of multiple pipes Y11, memory segments are allocated to pipe pairs S40. Multiple memory segments can be allocated to multiple pipes in various ways, for example as described above.

For each pipe pair, decision is made, if data are to be received R70, R71 or to be sent T70, T71. In case of data reception memory is allocated S72, S76 according to the description above and data are received S73, S77. In case of data transmission, memory is allocated S74, S78 according to the description above and data are sent S75, S79. Reallocation of memory between different endpoint pairs is possible by M70, M71. If the transmission is finished F70, F71, a new transmission mode can be chosen for the same device S4 or the device can be disabled alternatively which is not shown in the diagram.

Figure 3:
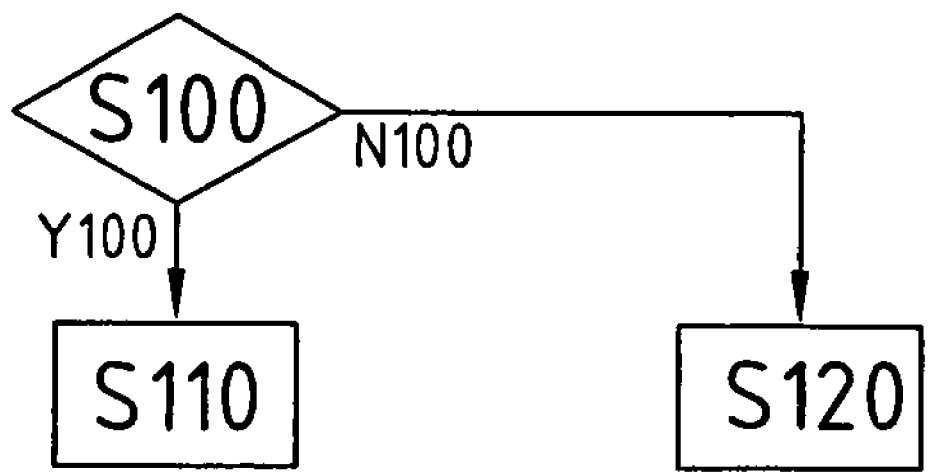
FIG. 3 shows the assignment of available memory to a newly established pipe

FIG. 3 illustrates schematically how a new endpoint in a device can be established sharing memory already assigned to the device.

S100 Already assigned memory available?

S110 New pipe has access to already available memory segment

S120 New memory segment is assigned and is accessible by new pipe

Communication is established in sequential mode S10 and memory is allocated S30, S40 as described above. If a new pipe and an according endpoint in the device are established, it is checked if already assigned memory is available S100. If memory is available Y100 this memory segment will be used for the new pipe too and the flag of the memory segment, indication how many pipes have access to this segment is increased by one S110. Multiple in or out pipes can use the same memory segment as long they work sequentially. If no memory is available, a new memory segment is assigned to this device, the flag indicating to which device the segment belongs is set and the flag indicating how many pipes have access to this segment is set to one S120.

What is claimed is:

1. Method for data transfer between a host and a device through pipes wherein an available memory in the host is divided into multiple segments, the method comprising assigning a segment of memory to a control pipe, identifying a mode of data transfer, determine a number of input pipes and output pipes to be established if a bulk transfer mode is identified, and assigning each memory segment to at maximum a single pipe at one time, wherein at least one memory segment is allocated to and shared by at least one input pipe and output pipe pair, and the allocation of the at least one memory segment is switched between pipes of the at least one pipe pair upon detection of a change in transmission mode, and wherein all memory segments assigned to the at least one pipe pair are assigned only to the output pipes or only to the input pipes of the at least one pipe pair at one time, and wherein if a memory segment ahead assigned is available for a new pipe to be established with a new endpoint, a flag indicating a number of pipes have access to the memory segment already assigned is increased by one.

2. Method according to claim 1, wherein bulk transfer mode is used.

3. Method according to claim 2, wherein one or multiple flags are added to each memory segment indicating to which pipe the memory segment is currently assigned.

4. Method according to claim 3, wherein a separate flag is used to tell to which device the memory segment is assigned to and another flag is used to tell how many pipes have access to said memory segment.

5. Method according to claim 4, wherein memory in the host is allocated to a bulk in pipe in case of communication from a device to the host and to a bulk out pipe in case of communication from a host to a device.

6. Method according to claim 3, wherein memory in the host is allocated to a bulk in pipe in case of communication from a device to the host and to a bulk out pipe in case of communication from a host to a device.

7. Method according to claim 2, wherein memory in the host is allocated to a bulk in pipe in case of communication from a device to the host and to a bulk out pipe in case of communication from a host to a device.

8. Method according to claim 1, wherein one or multiple flags are added to each memory segment indicating to which pipe the memory segment is currently assigned.

9. Method according to claim 8, wherein a separate flag is used to tell to which device the memory segment is assigned to and another flag is used to tell how many pipes have access to said memory segment.

10. Method according to claim 9, wherein memory in the host is allocated to a bulk in pipe in case of communication from a device to the host and to a bulk out pipe in case of communication from a host to a device.

11. Method according to claim 1, wherein in case of multiple in pipes or multiple out pipes, memory in the host is allocated to a specific in pipe or a specific out pipe depending on the traffic within certain pipes.

12. Method according to claim 11, wherein the assignment of the at least one memory segment is switched between the multiple in pipes or between the multiple out pipes.

13. Method according to claim 1, wherein the whole memory is segmented and all memory segments are assigned.

14. Method according to claim 1, wherein one or more memory segments are used as buffer for control transfer exclusively.

15. Method according to claim 1, wherein the data transmission is an USB transmission.

16. Apparatus with data transfer means to establish communication with another device through pipes wherein an available memory is divided into multiple segments, a segment of memory is assigned to a control pipe, identifying a mode of data transfer is identified, a number of input pipes and output pipes to be established is determined if a bulk transfer mode is identified, and each memory segment being assigned to at maximum a single pipe at one time wherein it is further provided with change in transmission mode detection means and switching means for assigning and sharing at least one memory segment to an input pipe and output pipe pair and changing assignment of the at least one memory segment between pipes of the at least one pipe pair upon detection of a change in transmission mode such that only the input pipes or only the output pipes of the at least one pipe have memory segments assigned to them at one time, wherein if a memory segment already assigned is available for a new pipe to be established with a new endpoint, a flag indicating a number of pipes have access to the memory segment already assigned is increased by one.

* * * * *